US008222791B2

(12) United States Patent
Lyle

(10) Patent No.: US 8,222,791 B2
(45) Date of Patent: *Jul. 17, 2012

(54) ALIGNMENT OF SEGMENTED STATORS FOR ELECTRIC MACHINES

(75) Inventor: David M. Lyle, O'Fallon, MO (US)

(73) Assignee: Nidec Motor Corporation, St. Louis, MO (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/208,520

(22) Filed: Aug. 12, 2011

(65) Prior Publication Data

US 2011/0291520 A1    Dec. 1, 2011

Related U.S. Application Data

(60) Continuation of application No. 12/551,050, filed on Aug. 31, 2009, now Pat. No. 8,018,115, which is a division of application No. 11/284,732, filed on Nov. 22, 2005, now Pat. No. 7,583,002.

(51) Int. Cl.
    *H02K 1/06*    (2006.01)
(52) U.S. Cl. .............................................. 310/216.009
(58) Field of Classification Search .............. 310/214, 310/215, 216.001–216.137
    See application file for complete search history.

(56) References Cited

U.S. PATENT DOCUMENTS

| 7,116,023 | B2 * | 10/2006 | Wang et al. ..................... 310/71 |
| 8,018,115 | B2 * | 9/2011 | Lyle ........................ 310/216.009 |
| 2004/0222715 | A1 * | 11/2004 | Yamamura et al. ........... 310/218 |

* cited by examiner

*Primary Examiner* — Nguyen N Hanh
(74) *Attorney, Agent, or Firm* — Hovey Williams LLP

(57) ABSTRACT

A stator segment for a segmented stator of an electric machine includes insulative material configured for overlapping with insulative material of an adjacent stator segment to provide continuous insulation along a joint between the adjacent stator segments. Additionally, or alternatively, the stator segment can include one or more alignment tabs configured to engage a surface of an adjacent stator segment to inhibit relative axial movement between adjacent stator segments.

25 Claims, 4 Drawing Sheets

ALIGNMENT OF SEGMENTED STATORS FOR ELECTRIC MACHINES

CROSS-REFERENCE TO RELATED APPLICATIONS

The present application is a continuation application of identically-titled U.S. patent application Ser. No. 12/551,050, filed Aug. 31, 2009, which is a divisional application of U.S. patent application Ser. No. 11/284,732, filed Nov. 22, 2005, entitled INSULATION AND ALIGNMENT OF SEGMENTED STATORS FOR ELECTRIC MACHINES, now U.S. Pat. No. 7,583,002, issued Sep. 1, 2009, the entirety of each of which is hereby incorporated by reference herein.

FIELD

The present disclosure relates generally to electric machines having segmented stators, including stator segments having continuous insulation and/or alignment features.

BACKGROUND

A variety of segmented stator designs for electric machines are known. By definition, these segmented stators include multiple individual stator segments that are assembled together. Each stator segment typically includes a metal core formed of laminated steel and defining yoke and tooth portions. An insulative material is typically positioned on one or more portions of each metal core to prevent direct contact (or arcing) between the metal cores and magnet wire wound around the stator teeth.

In the assembled segmented stator, the insulative material of each stator segment typically abuts the insulative materials of adjacent stator segments along their side edges. However, any gap between these adjacent insulative materials presents a potential arc path—between magnet wire on the stator teeth and the stator segments' metal cores—that can result in electrical shorting. For this reason, insulative paper is sometimes placed over the metal joints between adjacent stator segments. Alternatively, the amount of wire wound around the stator teeth is sometimes limited to ensure adequate clearance between the magnet wire and the metal cores. Additionally, fixturing tools and devices are commonly employed when assembling segmented stators to align the end faces of the individual stator segments with one another.

As recognized by the present inventors, existing designs for segmented stators and stator segments are disadvantaged in several respects. For example, the use of insulative paper along the joints between adjacent stator segments increases the manufacturing complexity and cost of segmented stators. Similarly, the use of fixturing tools for aligning the end faces of adjacent stator segments increases the manufacturing complexity and cost of segmented stators. Further, limiting the amount of magnet wire wound about the stator teeth can adversely affect the performance or efficiency of the segmented stator.

SUMMARY

The present inventors have succeeded at designing stator segments for a segmented stator having continuous insulation and/or alignment features.

According to one aspect of the disclosure, a stator segment for a segmented stator includes a yoke portion, a tooth portion, and an insulative material. The insulative material extends along at least one side edge of the yoke portion and is configured for overlapping with insulative material of an adjacent stator segment when assembled together in the segmented stator to thereby provide continuous insulation along a joint between the adjacent stator segments.

According to another aspect of the present disclosure, a stator segment for a segmented stator includes a yoke portion, a tooth portion, and at least a first tab extending from the yoke portion and configured to engage a surface of an adjacent stator segment when assembled together in the segmented stator to thereby inhibit relative axial movement between the adjacent stator segments.

According to yet another aspect of the disclosure, a segmented stator for an electric machine includes a plurality of annularly arranged stator segments. Each stator segment includes a yoke portion, a tooth portion and insulative material. The yoke portions define a wall from which the tooth portions extend. The insulative material of at least one stator segment overlaps with the insulative material of an adjacent stator segment along a portion of the wall to thereby provide continuous insulation over said portion of the wall.

According to another aspect of the disclosure, a segmented stator for an electric machine includes a plurality of annularly arranged stator segments. Each stator segment includes a yoke portion, a tooth portion, and a pair of tabs extending from opposite side edges and opposite end faces of the yoke portion. The pair of tabs of each stator segment engage top and bottom surfaces of adjacent stator segments to inhibit relative axial movement between the plurality of stator segments.

According to still another aspect of the disclosure, a segmented stator for an electric machine includes a plurality of annularly arranged stator segments. Each stator segment includes a yoke portion, a tooth portion, a metal core, insulative material positioned over the metal core, and a pair of tabs extending from opposite side edges of the yoke portion. The pair of tabs of each stator segment engage surfaces of adjacent stator segments to inhibit relative axial movement between the plurality of stator segments. Further, the insulative material of each stator segment defines a tongue and a groove on opposite side edges of the stator segment's yoke portion. The tongue and the groove of each stator segment engaging the groove and tongue, respectively, of adjacent stator segments to provide continuous insulation along joints between the metal cores of adjacent stator segments.

Further aspects of the present disclosure will be in part apparent and in part pointed out below. It should be understood that various aspects of the disclosure may be implemented individually or in combination with one another. It should also be understood that the detailed description and drawings, while indicating certain exemplary embodiments, are intended for purposes of illustration only and should not be construed as limiting the scope of the disclosure.

DETAILED DESCRIPTION OF EXEMPLARY EMBODIMENTS

Illustrative embodiments of the disclosure are described below. In the interest of clarity, not all features of an actual implementation are described in this specification. It will be appreciated that in the development of any actual embodiment, numerous implementation-specific decisions must be made to achieve specific goals, such as performance objectives and compliance with system-related, business-related and/or environmental constraints. Moreover, it will be appreciated that such development efforts may be complex and time-consuming, but would nevertheless be a routine undertaking for those of ordinary skill in the art having the benefit of this disclosure.

Figure 1A:
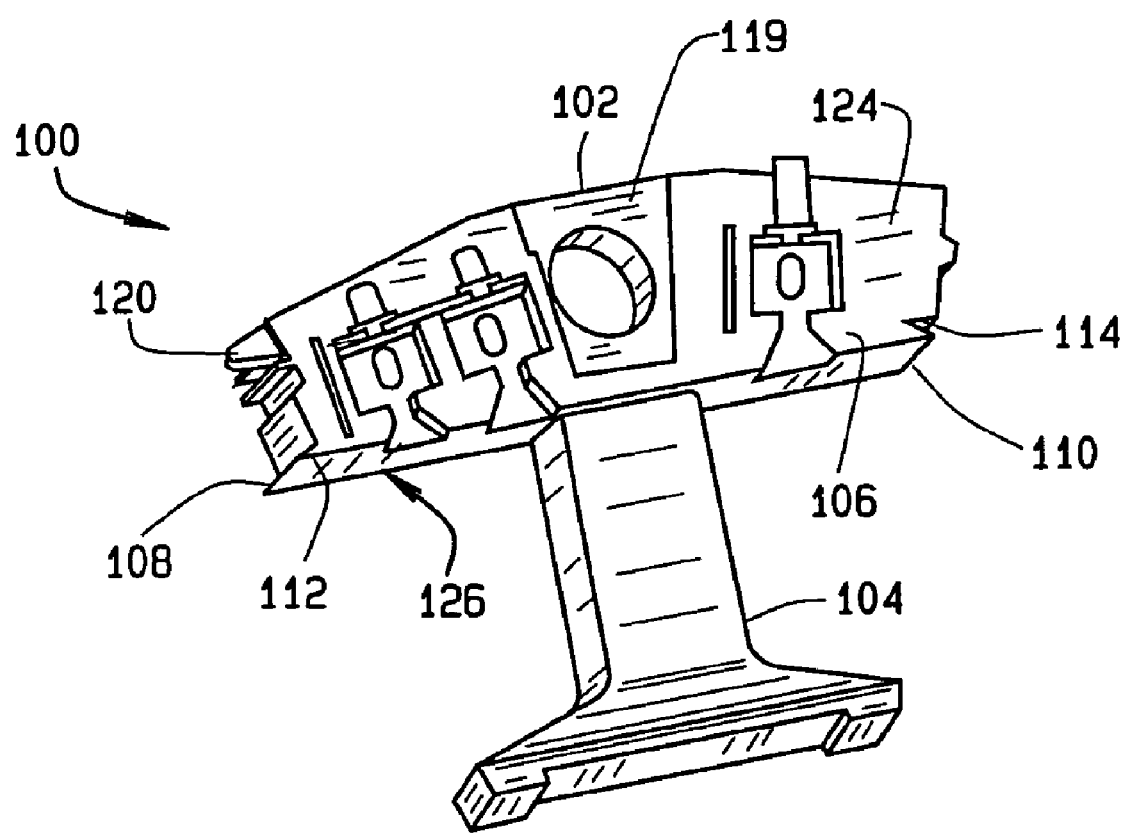
FIG. 1A is a perspective view of a stator segment according to one exemplary embodiment of the present disclosure.
Figure 1B:
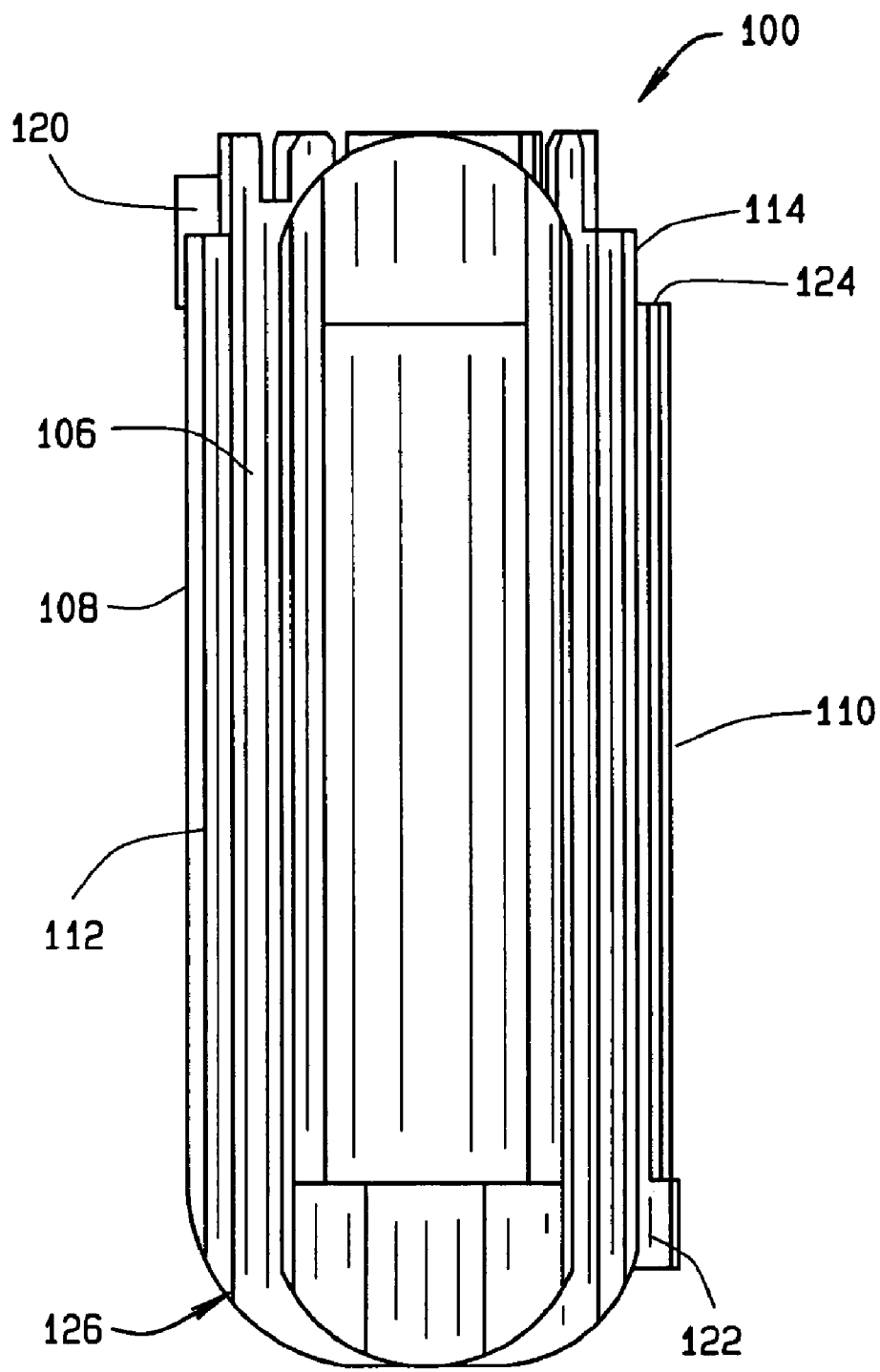
FIG. 1B is a side view of the stator segment of FIG. 1A.

A stator segment for a segmented stator of an electric machine according to a first exemplary embodiment of the present disclosure is illustrated in FIGS. 1A and 1B (sometimes referred to collectively as "FIG. 1") and indicated generally by reference numeral 100. As shown in FIG. 1, the stator segment 100 includes a yoke portion 102, a tooth portion 104, and electrically insulative material 106. The insulative material 106 covers portions of the stator segment 100 and electrically insulates such portions from, among other things, wire wound around the tooth portion 104 when the stator segment 100 is incorporated into a wound segmented stator assembly, as further explained below.

In the embodiment of FIG. 1, the insulative material 106 extends along opposite side edges 108, 110 of the yoke portion, and is configured for overlapping with the insulative material of adjacent stator segments. In particular, the insulative material 106 defines a tongue 112 on one side edge 108 and a groove 114 on the other side edge 110. The tongue 112 is configured for engaging a groove in a like stator segment positioned adjacent the side edge 108. The groove 114 is configured for engaging a tongue in a like stator segment positioned adjacent the side edge 110. As shown in FIG. 1B, the tongue 112 and the groove 114 extend along the entire length of the side edges 108, 110, respectively.

Figure 2:
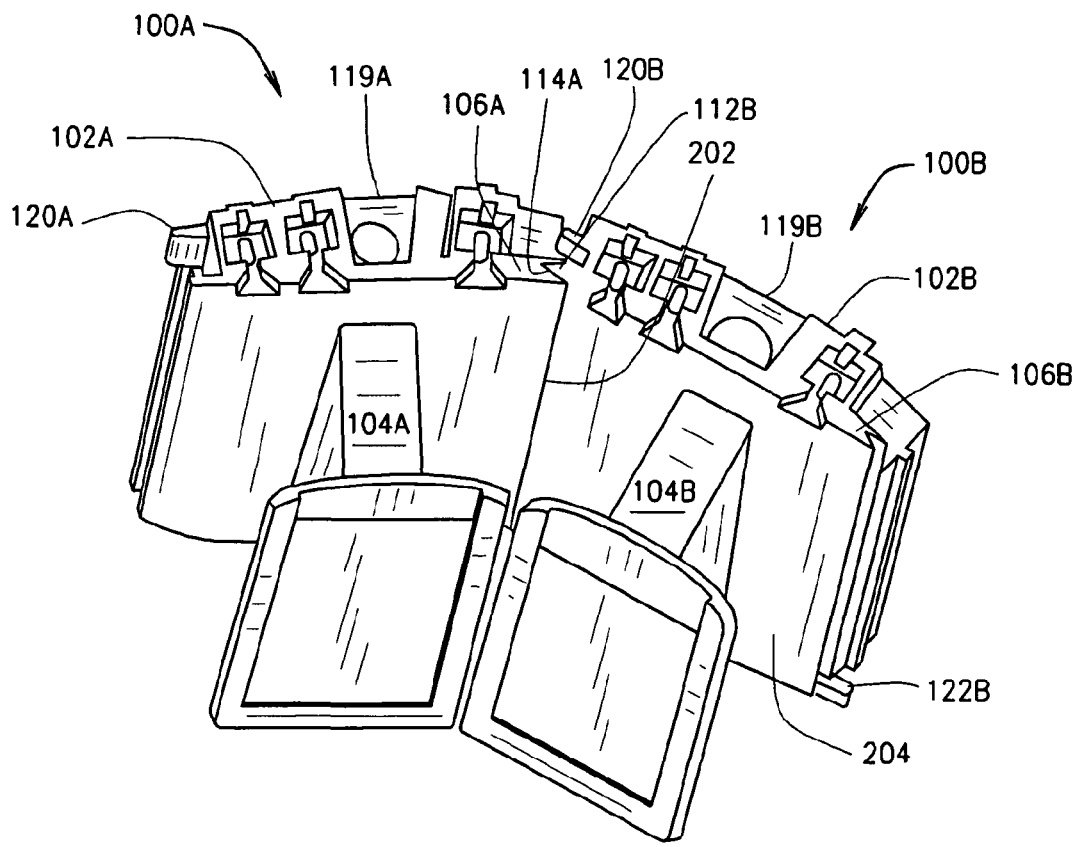
FIG. 2 is a perspective view of two stator segments according to FIG. 1 assembled together.

FIG. 2 illustrates two stator segments 100A, 100B that are connected together and identical to the stator segment 100 of FIG. 1. As shown in FIG. 2, the tongue 112B of stator segment 100B is received within the groove 114A of stator segment 100A. In this manner, the insulative material 106A of stator segment 100A overlaps the insulative material 106B of stator segment 100B along a joint 202 between the adjacent stator segments 100A, 100B. Due to this overlapping insulation, there is no direct arc path (to the underlying metal cores) between the insulative materials 106A, 106B along the joint 202. In this manner, a continuous insulation barrier is provided along the joint 202 between the adjacent stator segments 100A, 100B.

As further shown in FIG. 2, the insulative materials 106A, 106B preferably cover a wall 204 defined by the adjacent yoke portions 102A, 102B, as well as the tooth portions 104A, 104B which extend from the wall 204. In this manner, and in combination with the overlapping insulation provided along the joint 202, the insulative materials 106A, 106B form a continuous insulation barrier between the typically laminated metal (e.g. steel) cores which define the yoke portions 102A, 102B and the tooth portions 104A, 104B, and wire wound around the tooth portions 104A, 104B when the stator segments 100A, 100B are incorporated into a wound segmented stator assembly.

Figure 3:
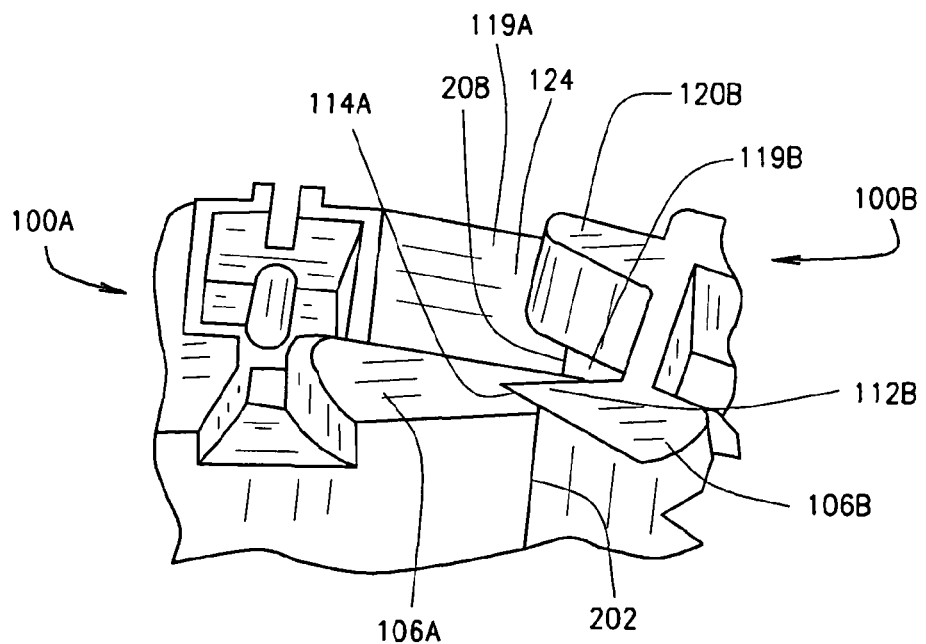
FIG. 3 is a partial perspective view of a joint between the adjacent stator segments of FIG. 2.

As best shown in FIG. 3, the tongue 112B and the groove 114A each have a triangular shape, as viewed from an end face 124 of the stator segments. It should be understood, however, that various other shapes can be employed for the tongue and the groove, and that various other overlapping insulation configurations can be employed to eliminate direct arc paths, without departing from the scope of the present disclosure. FIG. 3 further illustrates how, in this particular embodiment, the insulative materials 106A, 106B overlap one another along a joint 208 between the metal cores 119A, 119B of the adjacent stator segments 100A, 100B.

Referring again to FIG. 1, because the stator segment 100 is provided with the tongue 112 along one side edge 108 and the groove 114 along the opposite side edge 110, the stator segment 100 has a modular construction. In other words, the stator segment 100 can be annularly arranged and joined with additional identical stator segments 100 to form a segmented stator. Alternatively, the stator segment 100 could be provided with, for example, a tongue on both side edges 108, 110 for mating with adjacent stator segments having complementary grooves. In such a case, however, at least two distinct stator segment configurations must be employed to form a segmented stator assembly. The stator segment 100 could also be provided with multiple tongues and/or multiple grooves, or otherwise provided with insulative material configured to overlap the insulative material of an adjacent stator segment, without departing from the scope of the present disclosure.

In the embodiment of FIG. 1, the insulative material 106 is formed on the yoke and tooth portions 102, 104 via overmolding. In other words, the insulative material 106 (e.g., Thermoplastic/Thermoset) is molded over portions of the steel core 119 which defines the yoke and tooth portions 102, 104. Among other advantages, overmolding can be used to ensure each stator segment 100 has generally uniform dimensions, despite any size variations in the underlying steel core. In the embodiment of FIG. 1, the insulative material 106 has a minimum thickness of about 0.094 inches. Alternatively, the insulative material 106 can be formed separately (for example, as an insulative cap or end caps) using any suitable material and material thickness, and then assembled onto the stator segment 100.

Figure 4:
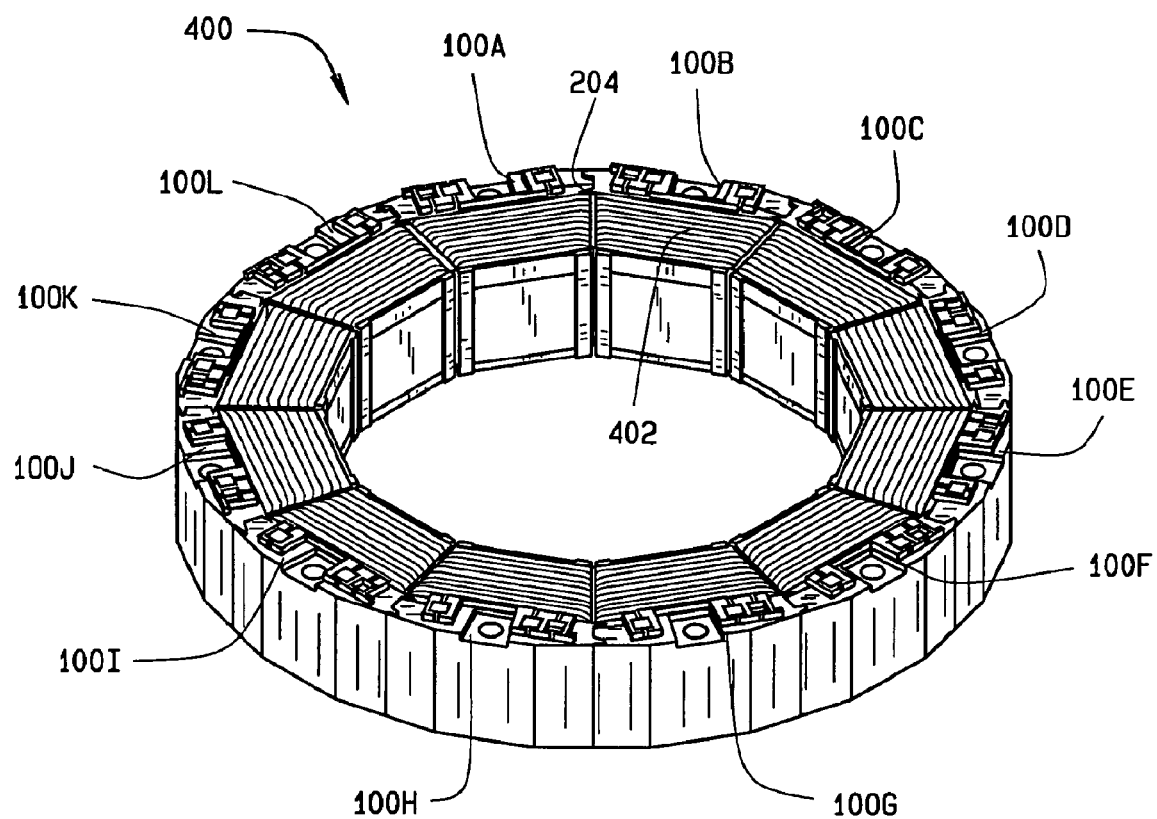
FIG. 4 is a perspective view of a segmented stator assembly according to another preferred embodiment of the present disclosure.

FIG. 4 illustrates a segmented stator assembly 400 according to another preferred embodiment of the present disclosure. The stator assembly 400 is constructed from multiple stator segments 100A-100L that are each identical to the stator segment 100 of FIG. 1. In the embodiment of FIG. 4, twelve stator segments 100A-100L are employed to form a ten pole, twelve slot stator assembly 400. It should be understood, however, that other numbers of stator segments, and other pole/slot combinations, can be employed without departing from the scope of the disclosure.

Additionally, FIG. 4 illustrates winding material 402 (e.g., copper wire, aluminum wire, etc.) wound around each tooth portion of the stator segments. As should be apparent from the description above, the winding material 402 is electrically isolated from the steel core of each stator segment by the continuous insulation barrier (including the overlapping insulative materials) formed on the wall 204.

With further reference to FIG. 1B, the stator segment 100 is also provided with two alignment tabs 120, 122 extending from the yoke portion 102 and configured to engage surfaces of adjacent stator segments. These tabs inhibit relative movement in the axial direction (i.e., a direction parallel to a center axis of the segmented stator and electric machine) between adjacent stator segments, as further explained below. In the embodiment of FIG. 1B, the tabs 120, 122 are provided on opposite side edges 108, 110 and opposite end faces 124, 126 of the yoke portion 102. It should be understood, however, that more or less tabs can be provided on the stator segment 100, and in different locations than tabs 120, 122, without departing from the scope of the present disclosure.

As shown in FIGS. 2 and 3, tab 120B of stator segment 100B engages a top end face 124 of the adjacent stator segment 100A. As a result, tab 120B prevents relative movement between the adjacent stator segments 100A, 100B in a first axial direction. Similarly, tab 122B of stator segment 100B is configured to engage a bottom end face 126 of an adjacent stator segment 100C (not shown in FIG. 2). As a result, tab 122B prevents relative movement between the adjacent stator segments 100B, 100C is a second axial direction, which is opposite the first axial direction. Thus, when multiple stator segments 100 are incorporated into the segmented stator assembly 400 of FIG. 4, the tabs 120, 122 of the multiple stator segments will, collectively, inhibit relative axial movement, in both directions, between each adjacent pair of stator segments. As a result, there is no need to use a fixturing device for aligning the end faces 124, 126 of the stator segments 100 when producing the segmented stator assembly 400 from the stator segments 100A-100L.

The tabs 120, 122 of each stator segment 100 are preferably dimensioned such that adjacent stator segments can be snapped together (i.e., via an interference fit) to releasable secure each stator segment to adjacent stator segments. With this configuration, the metal core of each yoke portion 102 is sandwiched between two tabs on each of its side edges 108, 110. Further, each tab 120, 122 preferably extends over a joint between adjacent stator segments. This is best shown in FIG. 3, where tab 120B is shown extending over the joint 208 between the steel cores 119A, 119B of the adjacent stator segments 100A, 100B. Alternatively, other configurations can be employed for the alignment tabs. Further, the alignment tabs can be configured to engage any desired surface of an adjacent stator segment so as to inhibit relative axial movement between adjacent stator segments.

In the embodiment of FIG. 1, the tabs 120, 122 are defined by the insulative material 106 via overmolding. Thus, the tabs 120, 122 are formed integrally with the tongue 112 and the groove 114 and other portions of the insulative material 106. Alternatively, the tabs, tongue and groove can each be formed separately, via independent overmolding process(es) and/or by manufacturing one or more of these parts separately and then assembling such part(s) by hand or machine onto the stator segment 100. Further, in the embodiment of FIG. 1, tab 120 is configured to engage insulative material on a top end face of an adjacent yoke portion, and tab 122 is configured to engage the steel core on a bottom end face of another adjacent yoke portion.

Although the alignment tab and overlapping insulation features are both incorporated into the stator segment 100 of FIG. 1, and the segmented stator assembly 400 of FIG. 4, it should be understood that such features can be readily implemented independent of one another. For example, the stator segment 100 can be provided with the overlapping insulation feature but without one or more alignment tabs, or vice versa.

Those skilled in the art will recognize that the teachings of the present disclosure can be applied to various electric machines (including motors and generators) employing segmented stators, including those employing outer rotor designs. Preferred applications include, but are not limited to, climate control systems (including blower motors for air handlers) and fluid pumps.

Those skilled in the art will recognize that various changes can be made to the exemplary embodiments and implementations described above without departing from the scope of the present disclosure. Accordingly, all matter contained in the above description or shown in the accompanying drawings should be interpreted as illustrative and not in a limiting sense.

What is claimed is:

1. A stator segment for a segmented stator, the stator segment comprising:
   a laminated stack comprising a plurality of stacked laminations,
   said laminations featuring similar geometry relative to each other and being oriented similarly in the stack,
   said stack presenting
      a yoke portion, and
      a tooth portion;
   a first tab extending from the yoke portion and configured to engage a surface of an adjacent stator segment when assembled together in the segmented stator to thereby inhibit relative axial movement between the adjacent stator segments; and
   a second tab extending from the yoke portion and configured to engage a surface of an adjacent stator segment when assembled together in the segmented stator,
   wherein the first and second tabs are positioned on opposite axial ends of the stator segment so as to be spaced axially from one another.

2. The stator segment of claim 1,
   wherein the first tab comprises an insulative material molded over the yoke portion.

3. The stator segment of claim 1,
   wherein the first and second tabs are positioned on opposite side edges of the yoke portion.

4. The stator segment of claim 3,
   wherein the first and second tabs are configured to releasably secure the stator segment to adjacent stator segments.

5. The stator segment of claim 1,
   wherein the first tab is configured to extend over a joint between the adjacent stator segments when assembled together in the segmented stator.

6. The stator segment of claim 1,
   wherein the first tab comprises an insulative end cap positioned on the yoke portion.

7. The stator segment of claim 1,
   wherein the first tab is the only tab extending from an end of the yoke portion on which the first tab is positioned.

8. The stator segment of claim 1,
   wherein the second tab is configured to engage a core surface of an adjacent stator segment when assembled together in the segmented stator.

9. The stator segment of claim 1,
   wherein the first tab extends from a first axial end of the yoke portion and the second tab extends from a second axial end of the yoke portion opposite the first axial end.

10. The stator segment of claim 9,
    wherein the second tab extends beyond a second side edge of the yoke portion opposite the first side edge.

11. The stator segment of claim 1,
    further comprising an insulative material on the yoke portion.

12. The stator segment of claim 11,
    wherein the insulative material is configured for overlapping with insulative material of an adjacent stator segment when assembled together in the segmented stator to provide substantially continuous insulation along a joint between adjacent stator segments.

13. The stator segment of claim 12, wherein the insulative material defines one of a tongue and a groove for overlapping with a groove or a tongue, respectively, of an adjacent stator segment.

14. The stator segment of claim 11, wherein the insulative material defines one of a tongue and a groove for overlapping with a groove or a tongue, respectively, of an adjacent stator segment.

15. A segmented stator for an electric machine, the stator comprising:
   a plurality of annularly arranged stator segments, each stator segment including:
      a laminated stack comprising a plurality of stacked laminations, with the stack presenting—
         a yoke portion, and
         a tooth portion;
      a first tab extending from the yoke portion; and
      a second tab extending from the yoke portion,
      the first tab of each stator segment engaging a surface of an adjacent stator segment to inhibit relative axial movement between the plurality of stator segments,
      the second tab engaging a surface of an adjacent stator segment,
      wherein the first and second tabs of each stator segment are positioned on opposite axial ends of the stator segment so as to be spaced axially from one another,
      wherein the stator segments are configured so that the laminations of each segment are prevented from overlapping the laminations of the adjacent stator segment.

16. The segmented stator of claim 15, wherein the first tab of each stator segment comprises an insulative material molded over the yoke portion.

17. The segmented stator of claim 15, wherein the first and second tabs of each stator segment are positioned on opposite side edges of the yoke portion.

18. The segmented stator of claim 17, wherein the first and second tabs of each stator segment are configured to releasably secure the stator segment to adjacent stator segments.

19. The segmented stator of claim 15, wherein the first tab of each stator segment extends over a joint between adjacent stator segments.

20. The segmented stator of claim 15, wherein on an end of each stator segment on which the first tab is positioned, the first tab is the only tab that engages a surface of an adjacent stator segment.

21. The segmented stator of claim 15, wherein the second tab engages a core surface of an adjacent stator segment.

22. The segmented stator of claim 15, wherein each stator segment comprises an insulative material molded over the yoke portion.

23. The segmented stator of claim 22, wherein the insulative material of at least one stator segment defines a tongue and the insulative material of an adjacent stator segment defines a groove, the tongue being received within the groove.

24. An electric machine comprising the segmented stator of claim 15.

25. The segmented stator of claim 15, wherein the laminations feature similar geometry relative to each other and are oriented similarly in the stack.

\* \* \* \* \*